United States Patent
Cui et al.

(10) Patent No.: US 11,340,777 B2
(45) Date of Patent: May 24, 2022

(54) METHOD FOR EDITING TEXT AND MOBILE TERMINAL

(71) Applicant: VIVO MOBILE COMMUNICATION CO., LTD., Chang'an Dongguan (CN)

(72) Inventors: Xiaodong Cui, Chang'an Dongguan (CN); Changyou Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 31 days.

(21) Appl. No.: 16/956,452

(22) PCT Filed: Dec. 18, 2018

(86) PCT No.: PCT/CN2018/121746
§ 371 (c)(1),
(2) Date: Jun. 19, 2020

(87) PCT Pub. No.: WO2019/120192
PCT Pub. Date: Jun. 27, 2019

(65) Prior Publication Data
US 2021/0096739 A1    Apr. 1, 2021

(30) Foreign Application Priority Data

Dec. 21, 2017    (CN) .......................... 201711391653.7

(51) Int. Cl.
*G06F 3/04883*    (2022.01)
*G06F 3/04842*    (2022.01)
(Continued)

(52) U.S. Cl.
CPC ........ *G06F 3/04883* (2013.01); *G06F 3/0486* (2013.01); *G06F 3/04842* (2013.01); *G06F 3/04847* (2013.01)

(58) Field of Classification Search
None
See application file for complete search history.

(56) References Cited

U.S. PATENT DOCUMENTS 8,584,049 B1    11/2013  Zhai
2006/0132455 A1*   6/2006  Rimas-Ribikauskas ..................... G06F 3/0488
345/173

(Continued)

FOREIGN PATENT DOCUMENTS

CN    102981765 A    3/2013
CN    104375756 A    2/2015
(Continued)

OTHER PUBLICATIONS

International Search Report & Written Opinion related to Application No. PCT/CN2018/121746; dated Jul. 2, 2020.

(Continued)

*Primary Examiner* — Linda Huynh
(74) *Attorney, Agent, or Firm* — von Briesen & Roper, s.c.

(57) ABSTRACT

A method for editing text and a mobile terminal are provided. The method includes: receiving a first input of a user on target text; displaying a preset text deletion control on a first preset side of the target text in response to the first input; receiving a second input of the user on the text deletion control; and deleting, in response to the second input, target sub-text selected by the second input, where the target text includes the target sub-text.

15 Claims, 11 Drawing Sheets

(51) Int. Cl.
*G06F 3/04847* (2022.01)
*G06F 3/0486* (2013.01)

(56) References Cited

U.S. PATENT DOCUMENTS

| | | | |
|---|---|---|---|
| 2010/0235785 A1* | 9/2010 | Ording | G06F 3/0488 715/810 |
| 2011/0239110 A1* | 9/2011 | Garrett | G06F 3/0488 715/702 |
| 2011/0320978 A1* | 12/2011 | Horodezky | G06F 3/0488 715/810 |
| 2012/0306772 A1* | 12/2012 | Tan | G06F 3/0488 345/173 |
| 2013/0024820 A1* | 1/2013 | Kirkpatrick | G06F 3/04883 715/863 |
| 2015/0123085 A1 | 5/2015 | Cheng | |
| 2016/0034086 A1* | 2/2016 | Milam | G06F 3/0414 345/173 |
| 2016/0274686 A1* | 9/2016 | Alonso Ruiz | G06F 3/04845 |
| 2017/0046025 A1* | 2/2017 | Dascola | G06F 3/04845 |
| 2017/0168711 A1* | 6/2017 | Temple | G06F 3/0233 |

FOREIGN PATENT DOCUMENTS

| | | |
|---|---|---|
| CN | 104834433 A | 8/2015 |
| CN | 104932807 A | 9/2015 |
| CN | 105094642 A | 11/2015 |
| CN | 105183310 A | 12/2015 |
| CN | 105224234 A | 1/2016 |
| CN | 105373309 A | 3/2016 |
| CN | 106802732 A | 12/2017 |
| CN | 107479786 A | 12/2017 |
| CN | 108132752 A | 6/2018 |
| WO | 2017027526 A1 | 2/2017 |

OTHER PUBLICATIONS

Chinese Office Action for related Chinese Application No. 201711391653.7; dated Oct. 8, 2019.
European Search Report related to Application No. 18890324.9 dated Jan. 18, 2021.

* cited by examiner

METHOD FOR EDITING TEXT AND MOBILE TERMINAL

CROSS-REFERENCE TO RELATED APPLICATION

This patent application is a 35 USC § 371 U.S. national stage of International Application No. PCT/CN2018/121746 filed on Dec. 18, 2018, which claims a priority to Chinese Patent Application No. 201711391653.7 filed in China on Dec. 21, 2017, disclosure of which is incorporated in its entirety by reference herein.

TECHNICAL FIELD

Embodiments of the present disclosure relate to the field of communication technology, in particular to a method for editing text and a mobile terminal.

BACKGROUND

With the rapid development of mobile terminals, mobile terminals already become an indispensable part of people's lives. During the process of using mobile terminals, it is inevitable to edit information of the mobile terminals to acquire a part of the information. For example, when a mobile terminal is used for socializing, it is quite common to forward a part of a short message received by the mobile terminal to another person. In the related art, in order to obtain a part of a short message, it is necessary to copy and paste the entire short message into an input box firstly, and then move a cursor to different positions to delete each to-be-deleted character in sequence. In the process of moving the cursor, an inaccurate positioning of the cursor tends to occur due to the small size of the cursor, and the position of the cursor has to be adjusted repeatedly. Therefore, it is fairly difficult to accurately position the cursor, and it takes a long time to edit text.

SUMMARY

In a first aspect, the present disclosure provides in some embodiments a method for editing text, including:
receiving a first input of a user on target text;
displaying a preset text deletion control on a first preset side of the target text in response to the first input;
receiving a second input of the user on the text deletion control; and
deleting, in response to the second input, target sub-text selected by the second input;
where the target text includes the target sub-text.

In a second aspect, the present disclosure further provides in some embodiments a mobile terminal, including:
a first receiving module, configured to receive a first input of a user on target text;
a display module, configured to display a preset text deletion control on a first preset side of the target text in response to the first input received by the first receiving module;
a second receiving module, configured to receive a second input of the user on the text deletion control displayed by the display module;
a deletion module, configured to delete, in response to the second input received by the second receiving module, target sub-text selected by the second input,
where the target text includes the target sub-text.

In a third aspect, the present disclosure further provides in some embodiments a mobile terminal, including: a storage, a processor, and a computer program stored in the storage and configured to be executed by the processor, where the processor is configured to execute the computer program to implement the steps in the foregoing method for editing text.

In a fourth aspect, the present disclosure further provides in some embodiments a computer-readable storage medium storing computer program thereon, where the computer program is executed by a processor to implement the steps in the foregoing method for editing text.

BRIEF DESCRIPTION OF THE DRAWINGS

FIG. 1-1 is a first diagram showing a display interface of a mobile terminal according to some embodiments of the present disclosure;

FIG. 1-2 is a second diagram showing a display interface of a mobile terminal according to some embodiments of the present disclosure;

FIG. 1-3 is a third diagram showing a display interface of a mobile terminal according to some embodiments of the present disclosure;

FIG. 1-4 is a fourth diagram showing a display interface of a mobile terminal according to some embodiments of the present disclosure;

FIG. 1-5 is a fifth diagram showing a display interface of a mobile terminal according to some embodiments of the present disclosure;

FIG. 1-6 is a sixth diagram showing a display interface of a mobile terminal according to some embodiments of the present disclosure;

DETAILED DESCRIPTION

The technical solutions in the embodiments of the present disclosure are clearly and thoroughly described below with reference to the accompanying drawings of the embodiments of the present disclosure. Apparently, the described embodiments are some embodiments of the present disclosure, but are not all the embodiments. Based on the embodiments of the present disclosure, all other embodiments derived by a person of ordinary skill in the art without creative efforts shall fall within the scope of the present disclosure.

Figure 1:
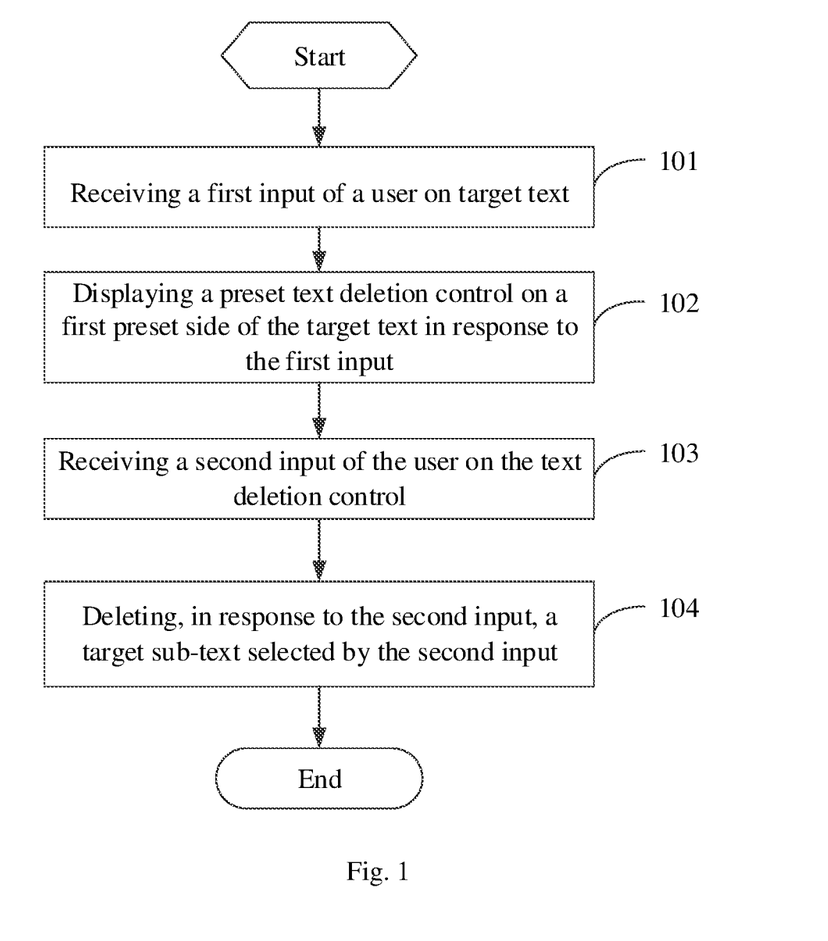
FIG. 1 is a flowchart of a method for editing text according to some embodiments of the present disclosure.

Referring to FIG. 1, FIG. 1 is a flowchart of a method for editing text according to some embodiments of the present disclosure. As shown in FIG. 1, the method includes the following steps:

A step 101 includes: receiving a first input of a user on target text.

The target text may be text information displayed on a screen of a mobile terminal, and includes a short message received by the mobile terminal, information displayed on a web page, or the like.

The first input may be an input of the user on an information display interface. The input may be specifically a press or a click input performed by the user on the target text on the information display interface, a press performed by the user on a side border, or the like.

A step 102 includes: displaying a preset text deletion control on a first preset side of the target text in response to the first input.

The text deletion control may be used to indicate that a part of the target text is to be selected, and the user may manipulate the text deletion control to select a part of the target text.

In this step, the mobile terminal may display the text deletion control on a side of the target text according to an operation manner of the user. For example, when the user uses a right-hand finger to operate on the screen, the text deletion control may be displayed to the upper left of the target text, so it is convenient for the user to view the selected to-be-deleted text during operation, thereby facilitating user's operation. For another example, when the mobile terminal is in landscape display mode, the text deletion control may be displayed to the right of the target text according to the habit of the user, to facilitate operations by a right-handed user. In addition, the text deletion control may be displayed at other position according to display content of the screen as long as user's operation is facilitated.

Figure 11:
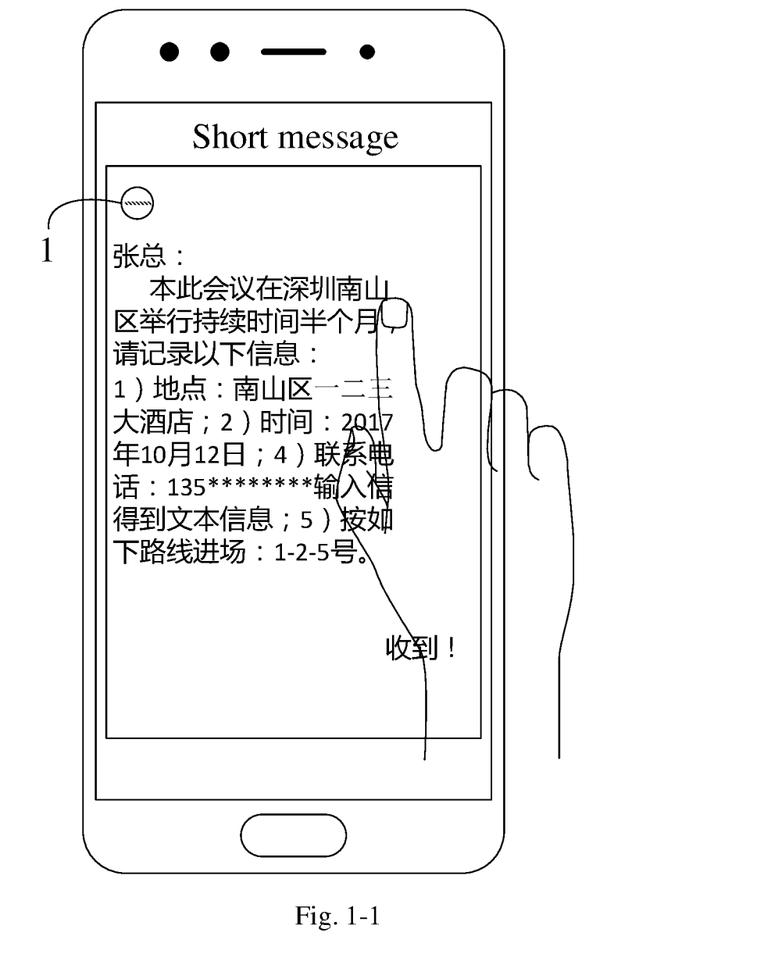

For example, as shown in FIG. 1-1, the user may perform the first input on text on a short message interface, and the mobile terminal displays a text deletion control 1 at an unoccupied position to the left of the text.

After the mobile terminal displays the text deletion control, when the user operates the text deletion control, the mobile terminal may add a preset identifier on the information display interface, to indicate to the user that the text deletion control may be further manipulated to select to-be-deleted text. For example, information on the information display interface may be displayed in gray or the text deletion control may blink, to prompt the user to perform an operation.

Figure 12:
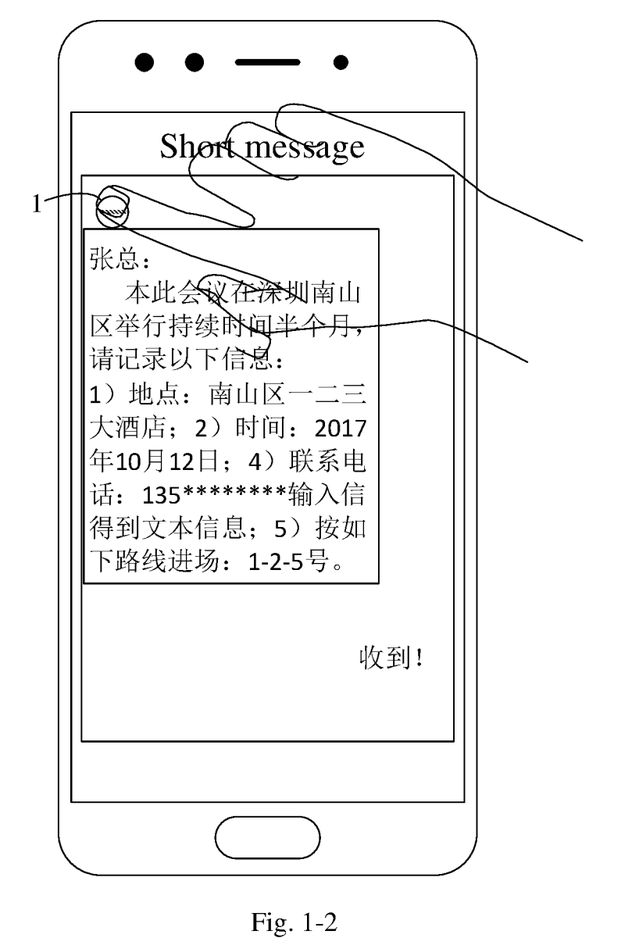

For example, as shown in FIG. 1-2, after the user operates the text deletion control, the mobile terminal selects all the text on the display interface by drawing a box around the text, to indicate to the user that the text in the box may be edited.

A step 103 includes: receiving a second input of the user on the text deletion control.

The second input may be an input performed by the user on the text deletion control. The second input may be specifically a press input, a click input, or the like.

A step 104 includes: deleting, in response to the second input, target sub-text selected by the second input, where the target text includes the target sub-text.

The target sub-text may be to-be-deleted text in the target text. In a specific implementation, when the user performs the second input on the text deletion control, the mobile terminal may display a positioning identifier in the target text. The identifier may be used to indicate a starting position of to-be-deleted target sub-information. In addition, the user may operate target information. The mobile terminal may determine the to-be-deleted target sub-information according to a trajectory of the user's operations. In this way, the user may rapidly determine that any target sub-text in the target text is selected, so as to delete the target sub-text.

Specifically, when the text deletion control is a joystick control and the second input is a touch operation of the user on the text deletion control, in this step, a preset positioning control is displayed on a second preset side of the target text in response to the second input; a target position of the positioning control in the target text is acquired; a touch pressure value of the touch operation is acquired; and a preset text deletion identifier is displayed on N consecutive characters in sequence starting from a first character of a target row, indicated by the target position, of the target text according to the size of the touch pressure value, where the target sub-text is the N consecutive characters, the deletion identifier is used to indicate that each character is deleted, and N is positively correlated with the size of the touch pressure value of the touch operation.

The touch operation may be a touch, a press, a click or the like performed by the user on the joystick control. After the mobile terminal receives the second input, the positioning control used to position the target sub-text is displayed on a side of the target text. In this case, the user may perform the touch operation on the joystick control, so as to control the position of the positioning control in the target text.

The acquisition of the target position of the positioning control in the target text may be implemented in the following manner: acquiring the touch operation direction of the touch operation; and controlling the positioning control to move to a target position according to the touch operation direction.

In the implementation, the user may perform a tilted press operation on the joystick control. The mobile terminal may control the positioning control to move in the direction of the tilted press operation.

Figure 13:
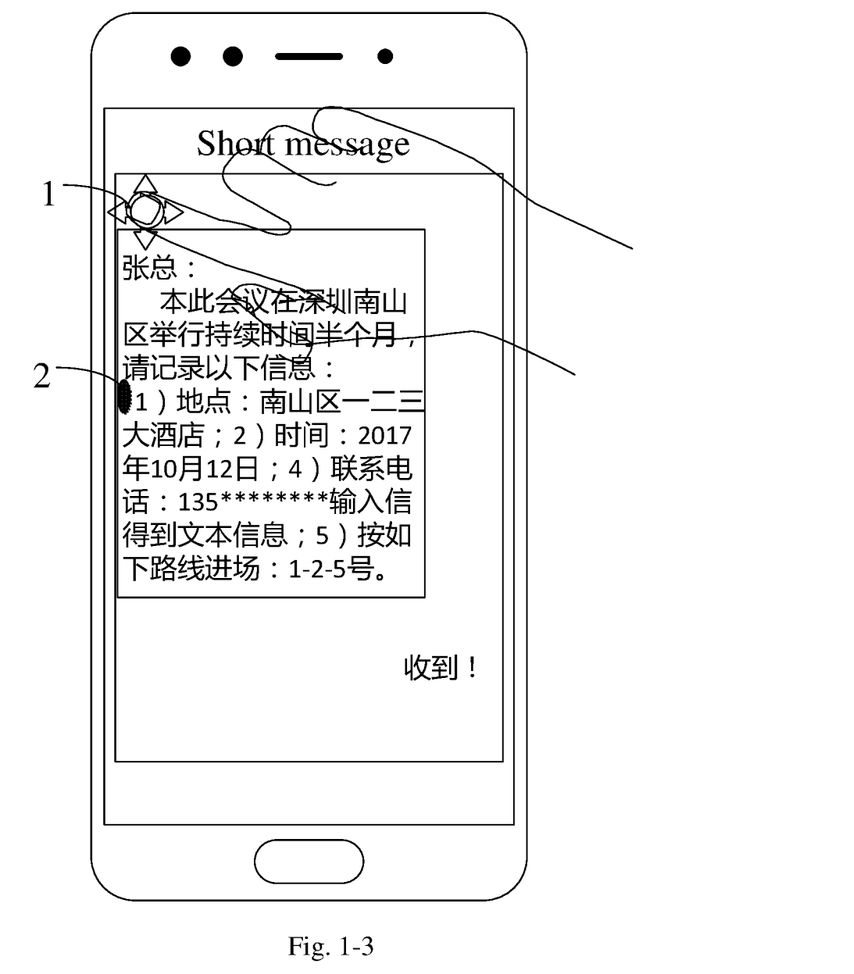

For example, as shown in FIG. 1-3, the user may control the position of a positioning control 2 by pressing a joystick control 1 upward, downward, to the left or to the right. When the joystick control 1 is pressed to the left, the positioning control 2 moves to the left. When the user presses the joystick control 1 downward, the positioning control 2 moves downward. In this way, the user may adjust the position of the positioning control in text by simply operating the joystick control. Therefore, the positioning control is easy to operate.

The acquisition of the target position of the positioning control in the target text may further be implemented in the following manner: receiving a drag input performed by the user on the positioning control; and identifying a drag end position of the drag input as the target position of the positioning control in the target text.

In the implementation, the user may directly perform a drag input on the positioning control. When the drag input ends, a drag end position of the drag input, that is, a position where a finger performing the drag input leaves the screen, may be acquired, and the drag end position is identified as the position of the positioning control in the target text. By operating the positioning control directly, the positioning control can be positioned more accurately.

For example, as shown in FIG. 1-3, the user may directly perform an input on the positioning control 2, that is, drag the positioning control 2 to any position in the text to determine to-be-deleted text. In this way, the operation are convenient, and the position of the positioning control in the text can be rapidly identified.

After identifying the target position of the positioning control in the target text, the user may continue to perform a touch operation on the text deletion control. The mobile terminal may detect a value of the pressure exerted on the screen by the touch operation, so that a range of to-be-deleted text can be determined according to the pressure value.

Specifically, a deletion identifier is added to N consecutive characters starting from the first character in a row where the positioning control is located. In a specific implementation, a deletion identifier may be added, starting from the position of the positioning control, to N consecutive characters immediately before or after the positioning control, to indicate that the N characters are to-be-deleted characters. In addition, the to-be-deleted characters may be displayed in a color different from other characters or the to-be-deleted characters may be crossed out, to distinguish the to-be-deleted characters from other characters.

Figure 14:
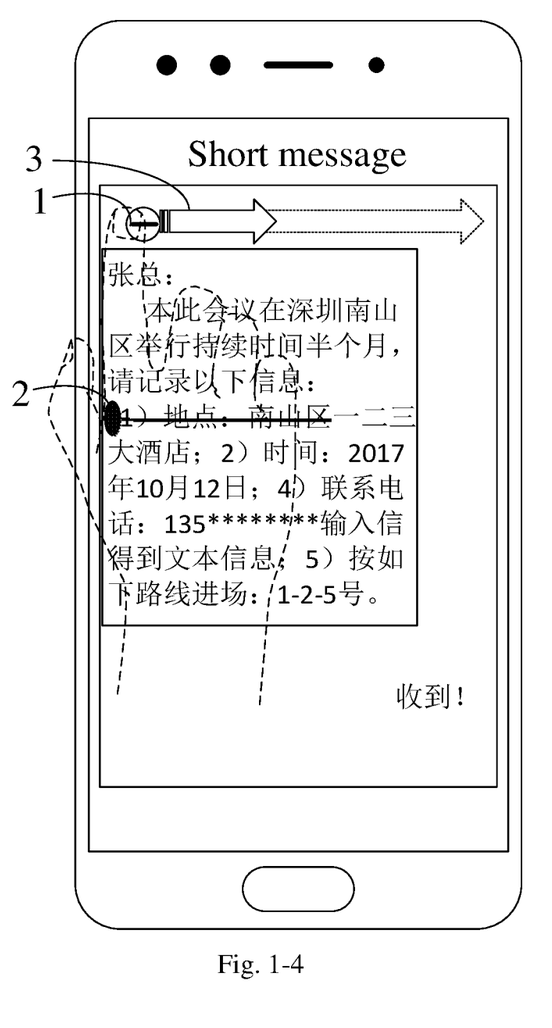

For example, as shown in FIG. 1-4, some consecutive characters after the positioning control are crossed out to indicate that these characters are to-be-deleted characters, and characters that are not crossed out are those need not to be deleted. In this way, the user may adjust the to-be-deleted characters according to the identifier, thereby the user operation is more convenient.

Figure 15:
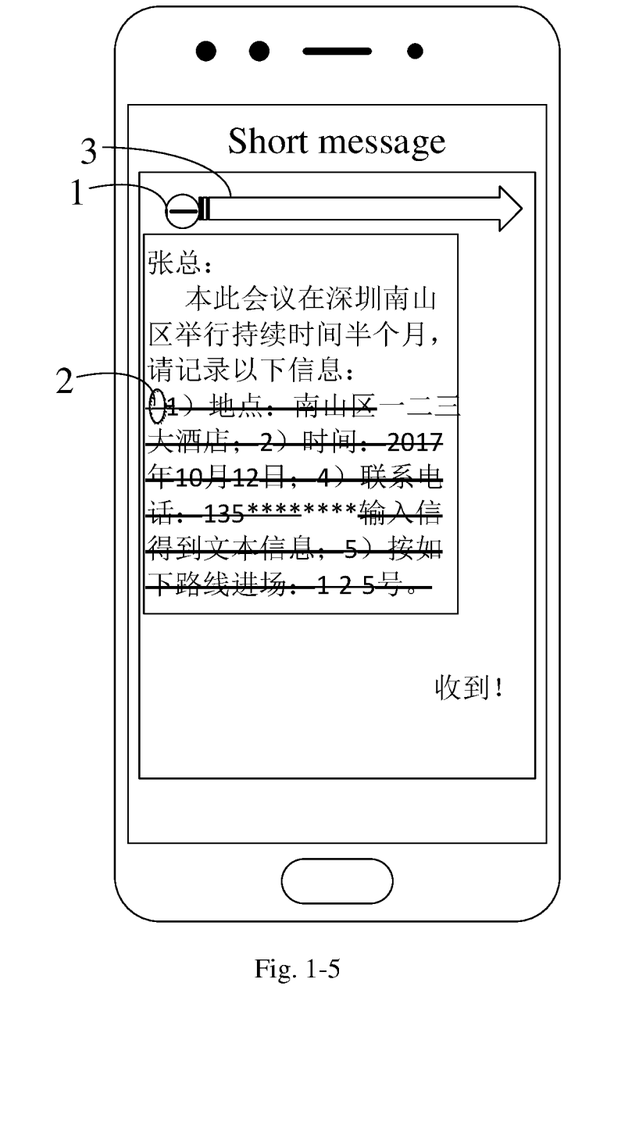
Figure 16:
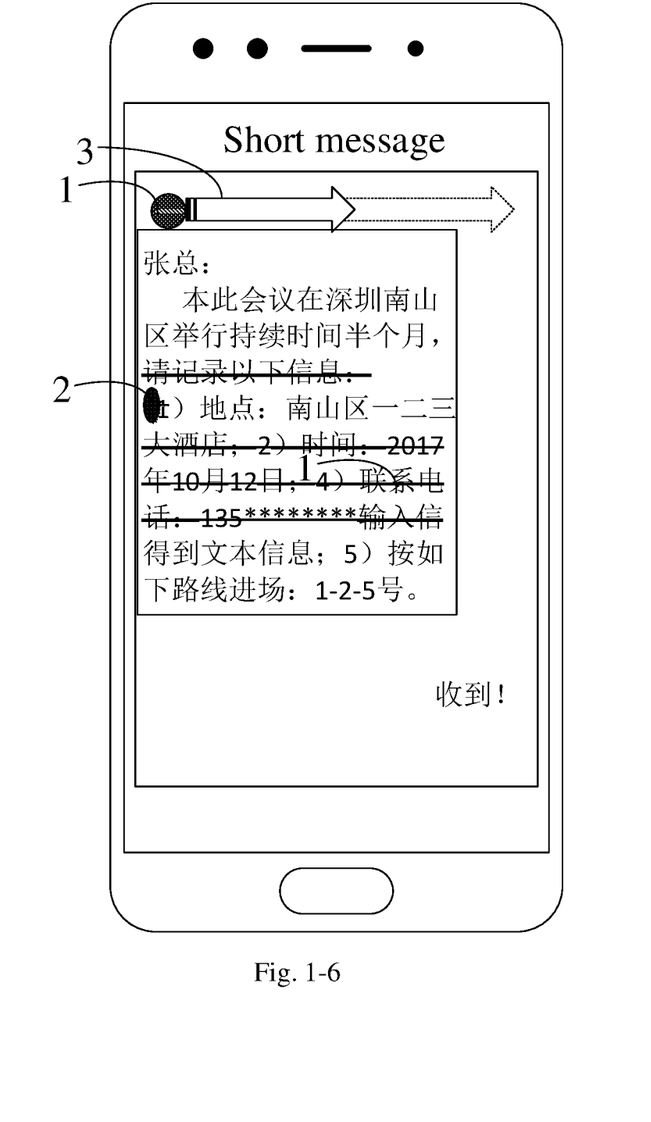

For example, as shown in FIG. 1-4, when the user performs a press on the text deletion control 1, a pressure bar 3 is displayed beside the text deletion control 1. The pressure bar 3 is used to indicate the size of the value of the pressure exerted on the text deletion control 1, to make it convenient for the user to know whether the pressure of the current touch operation increases or decreases, so that the user may adjust the pressure value of the touch operation correctly. The larger the pressure value of the touch operation is, the more characters the selected to-be-deleted target sub-text includes, that is, the value of N is greater. As shown in FIG. 1-5, when the pressure value is greater than a particular value, the pressure bar 3 indicates that the pressure is relatively large, and all characters after the positioning control 2 are selected. In this case, all the characters after the positioning control are crossed out. The smaller the pressure value of the touch operation is, as shown in FIG. 1-6, the pressure indicated by the pressure bar 3 decreases, the fewer characters the selected to-be-deleted target sub-text includes, that is, the value of N is less.

Optionally, after the displaying the deletion identifier on the N consecutive characters in sequence starting from the first character of the target row, indicated by the target position, of the target text according to a size of the touch pressure value, the method further includes: receiving a slide input performed by the user on M characters of the N consecutive characters; and removing the text deletion identifier on the M characters in sequence in response to the slide input.

In the implementation, when the user needs to cancel the selection of the target sub-text, the user may further perform an operation on the target sub-text, that is, the N consecutive characters. Specifically, a slide input may be performed on any M characters of the N characters, and the mobile terminal removes the text deletion identifier on the M characters, so as to remove the M characters from the N characters, that is, cancel the deletion of the M characters.

For example, as shown in FIG. 1-6, when the user performs the slide input on some characters among the characters with the deletion identifier, the deletion identifier on these characters is removed. The user may perform the slide input on a plurality of consecutive or nonconsecutive characters, so as to select text from which the deletion identifier is to be removed.

In this way, the user may rapidly cancel the selection of characters by performing the slide input on any character of the characters with the deletion identifier, thus the operation is flexible and convenient.

In addition, the user may perform the touch operation on the text deletion control again, to select text from which the deletion identifier is to be removed. The user may delete characters by choosing any operation manner according to his/her habit, thus the operation manners are varied.

In the embodiments of the present disclosure, the method for editing text may be applied to a mobile terminal, for example, a mobile phone, a tablet personal computer (PC), a laptop computer, a personal digital assistant (PDA), a mobile Internet device (MID), a wearable device, or the like.

In the method for editing text according to the embodiments of the present disclosure, a first input of a user on target text is received; a preset text deletion control is displayed on a first preset side of the target text in response to the first input; a second input of the user on the text deletion control is received; and target sub-text selected by the second input is deleted in response to the second input, where the target text includes the target sub-text. In this way, the user may edit information displayed on a display interface of a mobile terminal to acquire some of the information. Thus, information may be edited flexibly.

Figure 2:
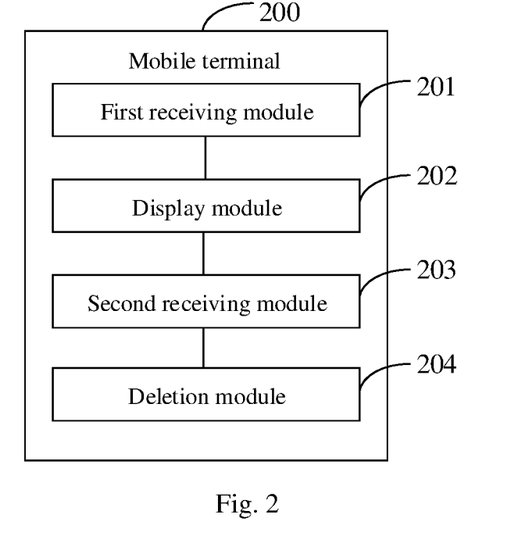
FIG. 2 is a first structural diagram of a mobile terminal according to some embodiments of the present disclosure.

Referring to FIG. 2, FIG. 2 is a structural diagram of a mobile terminal according to some embodiments of the present disclosure. As shown in FIG. 2, a mobile terminal 200 includes:

a first receiving module 201, configured to receive a first input of a user on target text;

a display module 202, configured to display a preset text deletion control on a first preset side of the target text in response to the first input received by the first receiving module 201;

a second receiving module 203, configured to receive a second input of the user on the text deletion control displayed by the display module 202;

a deletion module 204, configured to delete, in response to the second input, target sub-text selected by the second input received by the second receiving module 203, where the target text includes the target sub-text.

Figure 3:
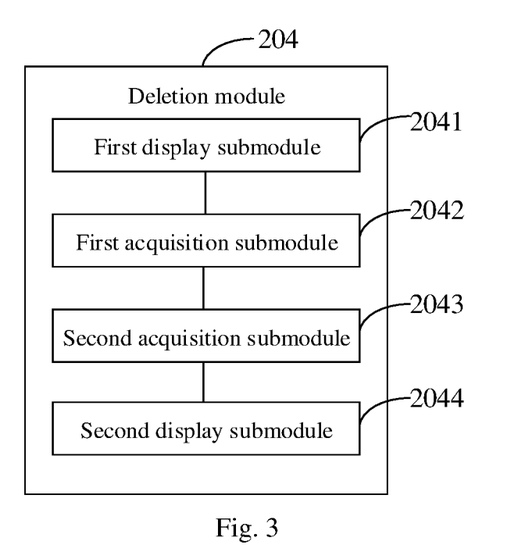
FIG. 3 is a structural diagram of a deletion module in a mobile terminal according to some embodiments of the present disclosure.

Optionally, as shown in FIG. 3, the text deletion control is a joystick control, and the second input is a touch operation of the user on the text deletion control;

the deletion module 204 includes:

a first display submodule 2041, configured to display a preset positioning control on a second preset side of the target text in response to the second input;

a first acquisition submodule 2042, configured to acquire a target position of the positioning control displayed by the first display submodule 2041 in the target text;

a second acquisition submodule 2043, configured to acquire a touch pressure value of the touch operation; and a second display submodule 2044, configured to display a preset text deletion identifier on N consecutive characters in sequence starting from a first character of a target row of the target text according to a size of the touch pressure value acquired by the second acquisition submodule 2043, where the target row is indicated by the target position, where the target sub-text is the N consecutive characters, the deletion identifier is used to indicate each deleted character, and N is positively correlated with the size of the touch pressure value of the touch operation.

Figure 4:
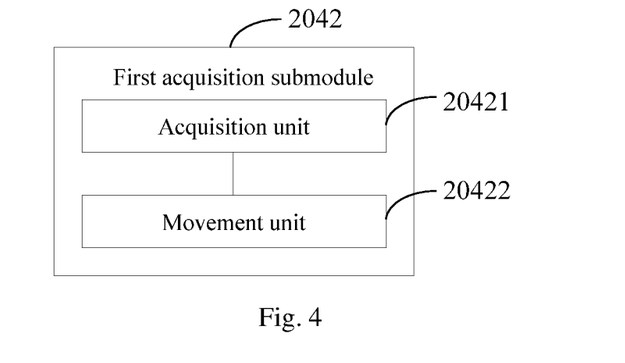
FIG. 4 is a first structural diagram of a first acquisition submodule in a mobile terminal according to some embodiments of the present disclosure.

Optionally, as shown in FIG. 4, the first acquisition submodule 2042 includes:

an acquisition unit 20421, configured to acquire a touch operation direction of the touch operation;

a movement unit 20422, configured to control the positioning control to move to the target position according to the touch operation direction acquired by the acquisition unit 20421.

Figure 5:
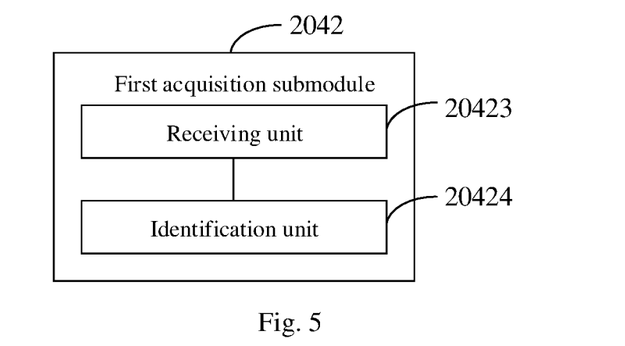
FIG. 5 is a second structural diagram of a first acquisition submodule in a mobile terminal according to some embodiments of the present disclosure.

Optionally, as shown in FIG. 5, the first acquisition submodule 2042 includes:

a receiving unit 20423, configured to receive a drag input performed by the user on the positioning control;

an identification unit 20424, configured to identify a drag end position of the drag input received by the receiving unit 20423 as the target position of the positioning control in the target text.

Figure 6:
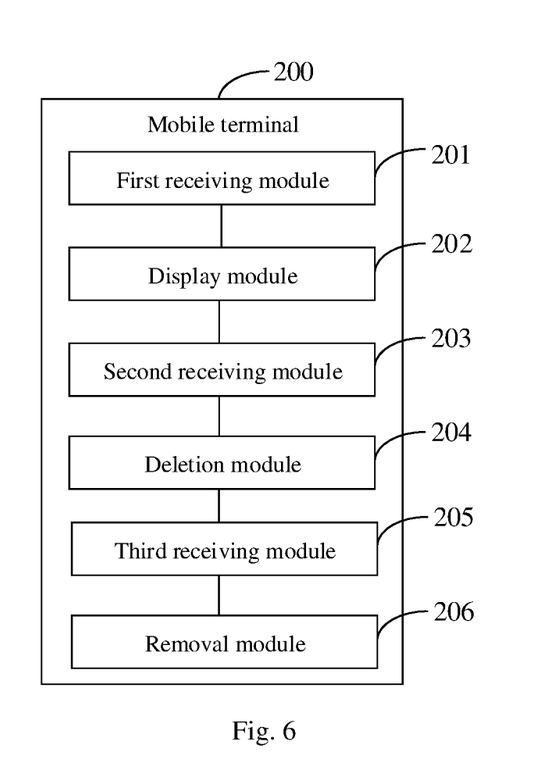
FIG. 6 is a second structural diagram of a mobile terminal according to some embodiments of the present disclosure.

Optionally, as shown in FIG. 6, the mobile terminal 200 further includes:

a third receiving module 205, configured to receive a slide input performed by the user on M characters of the N consecutive characters;

a removal module 206, configured to remove the text deletion identifier on the M characters in sequence in response to the slide input received by the third receiving module 205.

The mobile terminal 200 can implement the processes implemented by the mobile terminal in the foregoing method embodiments. To avoid repetition, details are not described herein again.

In the mobile terminal 200 according to the embodiments of the present disclosure, a first input of a user on target text is received; a preset text deletion control is displayed on a first preset side of the target text in response to the first input; a second input of the user on the text deletion control is received; and target sub-text selected by the second input is deleted in response to the second input, where the target text includes the target sub-text. In this way, the user may edit information displayed on a display interface of a mobile terminal to acquire some of the information. Thus, information may be edited flexibly.

Figure 7:
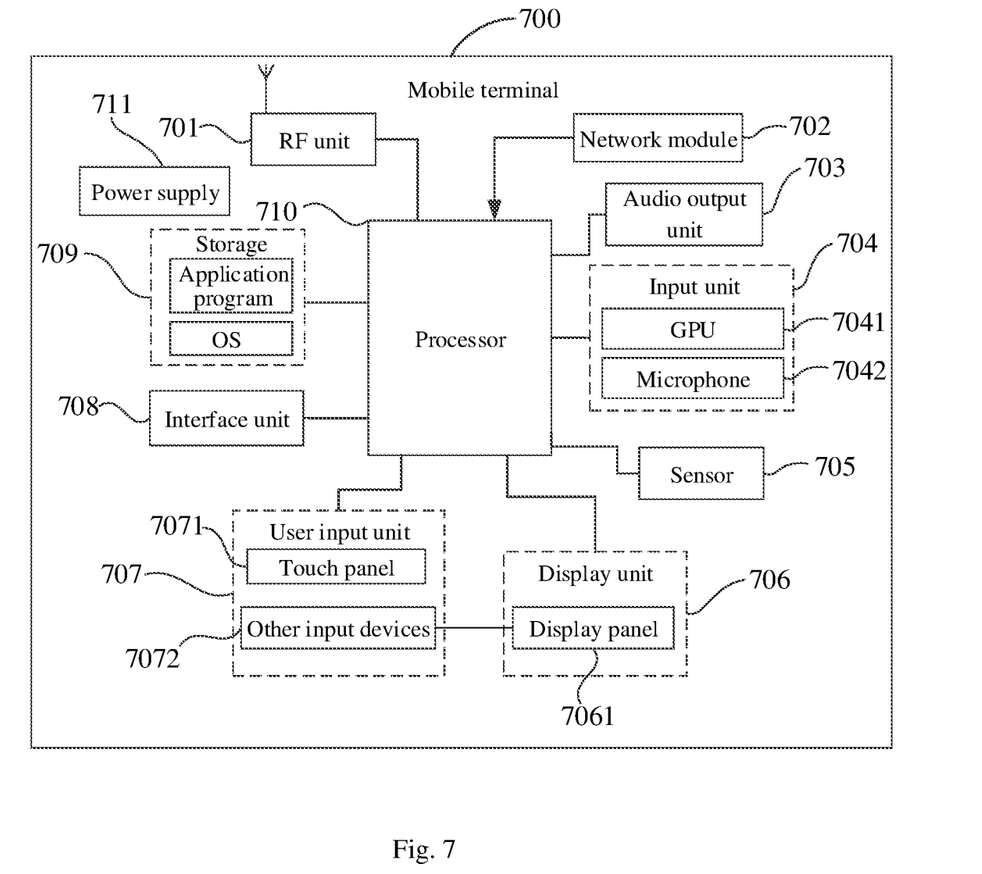
FIG. 7 is a third structural diagram of a mobile terminal according to some embodiments of the present disclosure.

FIG. 7 is a schematic structural diagram of hardware of a mobile terminal that may implement some embodiments of the present disclosure. A mobile terminal 700 includes, but is not limited to, a radio frequency (RF) unit 701, a network module 702, an audio output unit 703, an input unit 704, a sensor 705, a display unit 706, a user input unit 707, an interface unit 708, a storage 709, a processor 710, and a power supply 711, among other components. It may be understood by those skilled in the art that, the mobile terminal structure shown in FIG. 7 does not constitute a limitation on the mobile terminal, and the mobile terminal may include more or fewer components than those shown, or some components may be combined, or different component arrangements are used. In the embodiments of the present disclosure, the mobile terminal includes, but is not limited to, a mobile phone, a tablet computer, a notebook computer, a palmtop computer, an in-vehicle mobile terminal, a wearable device, and a pedometer.

The processor 710 is configured to: receive a first input of a user on target text; display a preset text deletion control on a first preset side of the target text in response to the first input; receive a second input of the user on the text deletion control; and delete, in response to the second input, target sub-text selected by the second input, where the target text includes the target sub-text.

In this way, the user may edit information displayed on a display interface of a mobile terminal to acquire some of the information. Thus, information may be edited flexibly.

Optionally, the text deletion control is a joystick control, and the second input is a touch operation of the user on the text deletion control; and the processor 710 is further configured to: display a preset positioning control on a second preset side of the target text in response to the second input; acquire a target position of the positioning control in the target text; acquire a touch pressure value of the touch operation; and display a preset text deletion identifier on N consecutive characters in sequence starting from a first character of a target row, indicated by the target position, of the target text according to a size of the touch pressure value, where the target sub-text is the N consecutive characters, the deletion identifier is used to indicate each deleted character, and N is positively correlated with the size of the touch pressure value of the touch operation.

Optionally, the processor 710 is further configured to: acquire a touch operation direction of the touch operation; and control the positioning control to move to the target position according to the touch operation direction.

Optionally, the processor 710 is further configured to: receive a drag input performed by the user on the positioning control; and identify a drag end position of the drag input as the target position of the positioning control in the target text.

Optionally, the processor 710 is further configured to: receive a slide input performed by the user on M characters of the N consecutive characters; and removing a text deletion identifier on the M characters in sequence in response to the slide input.

It should be understood that in some embodiments of the present disclosure, the RF unit 701 may be configured to transmit and receive signals during information transmission or phone call. To be specific, the RF unit 701 may, upon receiving downlink data from the base station, transmit the downlink data to the processor 710 for processing. In addition, the RF unit 701 may transmit uplink data to the base station. Usually, the RF unit 701 includes, but is not limited to: an antenna, at least one amplifier, a transceiver, a coupler, a low-noise amplifier, a duplexer and the like. In addition, the RF unit 701 may communicate with a network and other devices via a wireless communication system.

The mobile terminal provides a user with wireless broadband Internet access by means of the network module 702, such as sending and receiving emails, browsing webpages and accessing streamed media.

The audio output unit 703 is configured to convert audio data received by the RF unit 701 or the network module 702 or audio data stored in the storage 709 into an audio signal and output the audio signal as a sound. In addition, the audio output unit 703 is further configured to provide an audio output related to a specific function executed by the mobile terminal 700 (such as, incoming call ringtone, message received ringtone). The audio output unit 703 includes a loudspeaker, a buzzer and a telephone receiver.

The input unit 704 is configured to receive an audio or video signal. The input unit 704 may include a graphics processing unit (GPU) 7041 and a microphone 7042. The GPU 7041 is configured to process image data of a static image or video captured by an image capturing unit (e.g., a camera) in a video capturing mode or an image capturing mode, and a processed image frame may be displayed by the display unit 706. The image frame processed by the GPU 7041 may be stored in the storage 709 (or other storage medium) or transmitted via the RF unit 701 or network module 702. The microphone 7042 is configured to receive a sound, and convert the sound into audio data. In a phone call mode, the processed audio data may be converted into a format suitable for transmission to a mobile communication base station via the RF unit 701 and output.

The mobile terminal 700 further includes at least one sensor 705, for example, an optical sensor, a motion sensor, among others. In specific, the optical sensor includes ambient light sensor and proximity sensor. The ambient light sensor may adjust a brightness of a display panel 7061 according to the ambient light conditions. The proximity sensor may deactivate the display panel 7061 and/or a backlight when the mobile terminal 700 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the mobile terminal (e.g., switch between portrait and landscape modes, related games, magnetometer posture calibration), vibration identification related function (e.g., pedometer, tapping) and the like; the sensor 705 may further include a fingerprint sensor, a pressure sensor, an iris sensor, a molecule sensor, a gyroscope, a barometer, a hygrometer, a thermometer, an infrared sensor and the like, which is not described in detail herein.

The display unit 706 is configured to display information inputted by the user or provided to the user. The display unit 706 may include the display panel 7061. The display panel 7061 may be constructed in form of liquid crystal display (LCD), organic light-emitting diode (OLED) or the like.

The user input unit 707 may be configured to receive input numerical information or character information, and generate key signal inputs related to the user setting and function control of the mobile terminal. To be specific, the user input unit 707 includes a touch panel 7071 and other input device 7072. The touch panel 7071, also known as touch screen, may detect the touches thereon or in the vicinity thereof performed by the user (such as touch operations performed on or in the vicinity of the touch panel 7071 by the user using a finger, stylus or any other suitable object or accessory). The touch panel 7071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 710, as well as receives and executes the commands from the processor 710. Further, the touch panel 7071 may be implemented in a variety of modes, such as resistance, capacitance, infrared and surface acoustic wave. In addition to the touch panel 7071, the user input unit 707 may include other input devices 7072. In specific, the other input devices 7072 may include, but is not limited to: physical keyboard, functional keys (such as volume control button, switch button, etc.), track ball, mouse, joystick, which is not described in detail herein.

Further, the touch panel 7071 may overlie the display panel 7061. Having detected a touch operation thereon or in the vicinity thereof, the touch panel 7071 conveys the detected touch signal to the processor 710 to determine a category of the touch event, and the processor 710 provides corresponding visual output on the display panel 7061 in accordance with the category of the touch event. Although, in FIG. 7, the touch panel 7071 and the display panel 7061 are provided as two separate parts to implement the input and output functions of the mobile terminal, the touch panel 7071 and the display panel 7061 may be integrated to implement the input and output functions of the mobile terminal in some embodiments, which is not limited herein.

The interface unit 708 is an interface by which an external device is connected to the mobile terminal 700. For example, the external device may include a wired or wireless headset port, an external power source (or battery charger) port, a wired or wireless data port, a storage card port, a port configured to be connected to a device having an identification module, an audio input/output (I/O) port, a video I/O port, an earphone port and the like. The interface unit 708 may be configured to receive input (e.g., data information, power, etc.) from the external device and transfer the received input to one or more components in the mobile terminal 700, or may be configured to transmit data between the mobile terminal 700 and the external device.

The storage 709 may be configured to store software program and various data. The storage 709 may include generally a program storage area and a data storage area. The program storage area may store an operating system (OS), an application program required for at least one function (such as an audio playing function and an image playback function) and the like; the data storage area may store data (e.g., audio data, phone book, etc.) created according to usage of a mobile phone, and the like. Moreover, the storage 709 may include a cache, as well as a non-volatile storage, such as at least one disk storage device, flash memory or other non-volatile solid-state storage devices.

The processor 710 is a control center of the mobile terminal. The processor 710 is connected to various parts of the entire mobile terminal through various interfaces and lines, and performs various functions of the mobile terminal and processes data by executing or running software programs and/or modules stored in the storage 709 and invoking data stored in the storage 709, so as to achieve an overall monitoring of the mobile terminal. The processor 710 may include one or more processing units; optionally, the processor 710 may integrate an application processor and a modem, wherein the application processor is mainly responsible for executing an operating system, a user interface, an application program, etc., while the modem is mainly responsible for handling wireless communication. It is understood, the modem may not be integrated in the processor 710.

The mobile terminal 700 may further include a power supply 711 (e.g., a battery) providing power to various components. Optionally, the power supply 711 may be logically connected to the processor 710 via a power management system, such that functions such as charging management, discharging management and power management may be achieved through the power management system.

In addition, the mobile terminal 700 includes some functional modules not shown. Details are not described herein again.

Optionally, the present disclosure further provides in some embodiments a mobile terminal, including a processor 710, a storage 709, and a computer program stored in the storage 709 and executable by the processor 710. The computer program is configured to be executed by the processor 710 to implement various processes in the embodiments of the foregoing method for editing text, and can achieve the same technical effects. To avoid repetition, details are not described herein again.

The present disclosure further provides in some embodiments a computer-readable storage medium, where the computer-readable storage medium stores therein a computer program, and the computer program is configured to be executed by a processor to implement various processes of the embodiments of the foregoing method for editing text, and can achieve the same technical effects. To avoid repetition, details are not described herein again. The computer-readable storage medium may be, for example, a read-only memory (ROM), a random access memory (RAM), a magnetic disk, an optical disc, or the like.

It should be noted that the terms "include", "comprise", or any variation thereof herein are intended to cover a non-exclusive inclusion. Therefore, in the context of a process, method, article, or apparatus that includes a series of elements, the process, method, article, or apparatus not only includes such elements, but also includes other elements not specified expressly, or may include elements inherent to the process, method, article, or apparatus. In case that there is no further limitation, an element preceded by "includes or including" does not preclude existence of additional identical elements in the process, the method, the article, or the apparatus including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A method for editing text, comprising:
    receiving a first input of a user on target text;
    displaying a preset text deletion control on a first preset side of the target text in response to the first input;
    receiving a second input of the user on the preset text deletion control; and
    deleting, in response to the second input, target sub-text selected by the second input,
    wherein the target text comprises the target sub-text;
    the preset text deletion control is a joystick control, and the second input is a touch operation of the user on the joystick control;
    wherein the joystick control is immobile and, when being subject to a pressure in a direction, causes a preset positioning control to move in the direction.

2. The method according to claim 1, wherein the deleting, in response to the second input, the target sub-text selected by the second input comprises:
    displaying the preset positioning control on a second preset side of the target text in response to the second input;
    acquiring a target position of the preset positioning control in the target text;
    acquiring a touch pressure value of the touch operation; and
    displaying a preset text deletion identifier on N consecutive characters in sequence starting from a first character of a target row of the target text according to a size of the touch pressure value, wherein the target row is indicated by the target position,
    wherein the target sub-text is the N consecutive characters, the preset text deletion identifier is used to indicate each deleted character, and N is positively correlated with the size of the touch pressure value of the touch operation.

3. The method according to claim 2, wherein the acquiring the target position of the preset positioning control in the target text comprises:
    acquiring a touch operation direction of the touch operation; and
    controlling the preset positioning control to move to the target position according to the touch operation direction.

4. The method according to claim 2, wherein the acquiring the target position of the preset positioning control in the target text comprises:
    receiving a drag input performed by the user on the preset positioning control; and
    identifying a drag end position of the drag input as the target position of the preset positioning control in the target text.

5. The method according to claim 2, further comprising:
    after the displaying the preset text deletion identifier on N consecutive characters in sequence starting from the first character of the target row of the target text according to the size of the touch pressure value, wherein the target row is indicated by the target position,
    receiving a slide input performed by the user on M Characters of the N consecutive characters; and
    removing the preset text deletion identifier on the M characters in sequence in response to the slide input.

6. A mobile terminal, comprising: a storage, a processor, and a computer program stored in the storage and configured to be executed by the processor, wherein the processor is configured to execute the computer program to implement following steps:
    receiving a first input of a user on target text;
    displaying a preset text deletion control on a first preset side of the target text in response to the first input;
    receiving a second input of the user on the preset text deletion control; and
    deleting, in response to the second input, target sub-text selected by the second input,
    wherein the target text comprises the target sub-text;
    the preset text deletion control is a joystick control, and the second input is a touch operation of the user on the joystick control;
    wherein the joystick control is immobile and, when being subject to a pressure in a direction, causes a preset positioning control to move in the direction.

7. The mobile terminal according to claim 6, wherein the processor is further configured to execute the computer program to implement following steps:
    displaying the preset positioning control on a second preset side of the target text in response to the second input;
    acquiring a target position of the preset positioning control in the target text;

acquiring a touch pressure value of the touch operation; and displaying a preset text deletion identifier on N consecutive characters in sequence starting from a first character of a target row of the target text according to a size of the touch pressure value, wherein the target row is indicated by the target position, wherein the target sub-text is the N consecutive characters, the preset text deletion identifier is used to indicate each deleted character, and N is positively correlated with the size of the touch pressure value of the touch operation.

8. The mobile terminal according to claim 7, wherein the processor is further configured to execute the computer program to implement following steps:

acquiring a touch operation direction of the touch operation; and controlling the preset positioning control to move to the target position according to the touch operation direction.

9. The mobile terminal according to claim 7, wherein the processor is further configured to execute the computer program to implement following steps:

receiving a drag input performed by the user on the preset positioning control; and identifying a drag end position of the drag input as the target position of the preset positioning control in the target text.

10. The mobile terminal according to claim 7, wherein the processor is further configured to execute the computer program to implement following steps;

receiving a slide input performed by the user on M characters of the N consecutive characters; and removing the preset text deletion identifier on the M characters in sequence in response to the slide input.

11. A non-transitory computer-readable storage medium storing computer program thereon, wherein the computer program is executed by a processor to implement following steps:

receiving a first input of a user on target text;

displaying a preset text deletion control on a first preset side of the target text in response to the first input;

receiving a second input of the user on the preset text deletion control; and deleting, in response to the second input, target sub-text selected by the second input, wherein the target text comprises the target sub text;

the preset text deletion control is a joystick control, and the second input is a touch operation of the user on the joystick control;

wherein the joystick control is immobile and, when being subject to a pressure in a direction, causes a preset positioning control to move in the direction.

12. The non-transitory computer-readable storage medium according to claim 11, wherein the computer program is executed by a processor to further implement following steps:

displaying the preset positioning control on a second preset side of the target text in response to the second input;

acquiring a target position of the preset positioning control in the target text;

acquiring a touch pressure value of the touch operation; and displaying a preset text deletion identifier on N consecutive characters in sequence starting from a first character of a target row of the target text according to a size of the touch pressure value, wherein the target row is indicated by the target position, wherein the target sub-text is the N consecutive characters, the preset text deletion identifier is used to indicate each deleted character, and N is positively correlated with the size of the touch pressure value of the touch operation.

13. The non-transitory computer-readable storage medium according to claim 12, wherein the computer program is executed by a processor to further implement following steps;

acquiring a touch operation direction of the touch operation; and controlling the preset positioning control to move to the target position according to the touch operation direction.

14. The non-transitory computer-readable storage medium according to claim 12, wherein the computer program is executed by a processor to further implement following steps:

receiving a drag input performed by the user on the preset positioning control; and identifying a drag end position of the drag input as the target position of the preset positioning control in the target text.

15. The non-transitory computer-readable storage medium according to claim 12, wherein the computer program is executed by a processor to further implement following steps:

receiving a slide input performed by the user on M characters of the N consecutive characters; and removing the preset text deletion identifier on the M characters in sequence in response to the slide input.

* * * * *